Patented May 18, 1954

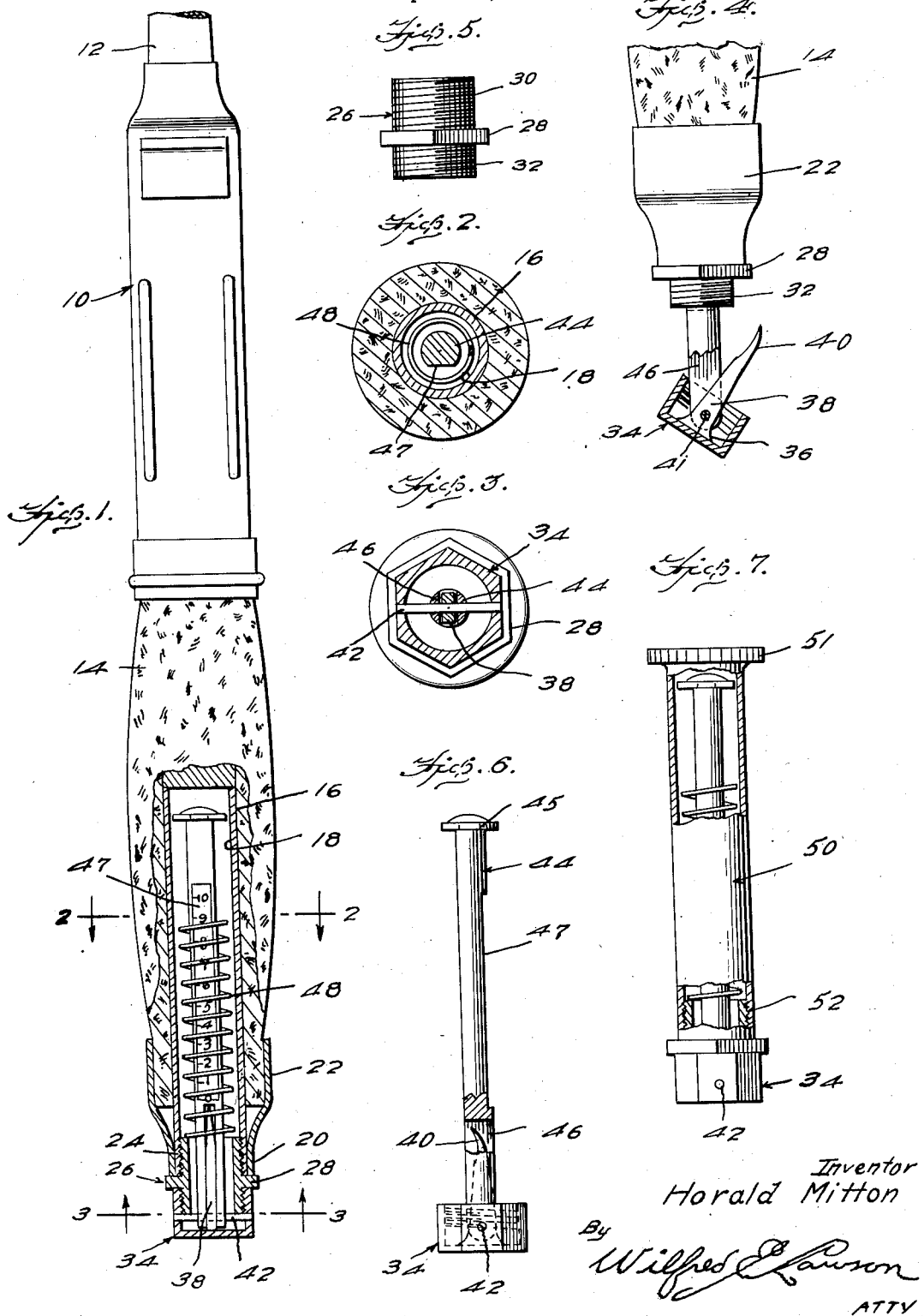

2,678,817

UNITED STATES PATENT OFFICE 2,678,817

WEIGHING SCALE

Horald Mitton, Drummond, Mont., assignor of one-half to Thomas Malcom Hughes, Drummond, Mont.

Application April 21, 1952, Serial No. 283,381

5 Claims. (Cl. 265—63)

This invention relates generally to the class of sporting equipment and is directed particularly to an improved scales for use by a fisherman.

A particular object of the present invention is to provide, in the manner as hereinafter set forth, a novel combination fishing pole handle and weighing scales by means of which a fisherman using the pole having the scales in the handle thereof, may easily and quickly determine the weight of a fish as it is taken off of the hook.

Another object of the invention is to provide an improved scales of the character stated having novel means of closing the tubular receptacle in which is housed the spring suspended shaft upon which are placed numerals designating pounds, which closing or closure means carries a hanging barb upon which the fish is hung to be weighed.

Another object of the invention is to provide in a device of the character stated, a spring suspended numeral carrying bar having a closure cap pivotally supported on its lower end for connection with a part of the casing in which the bar is housed and having a suspension barb or hook carried by the cap and adapted to be encased in a recess or slot in the lower end of the bar to which the cap is attached.

Another object of the invention is to provide a weighing device of the character stated which is designed to be mounted in a tubular chamber in the butt end of a fishing rod handle, with a pocket carrying case into which the scale can be enclosed when removed from the rod handle.

The invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 illustrates the handle or butt of a fishing rod with a portion of the same broken away and showing positioned therein a weighing scale constructed in accordance with the present invention.

Figure 2 is a transverse section taken substantially on the line 2—2 of Figure 1.

Figure 3 is a transverse section taken substantially on the line 3—3 of Figure 1.

Figure 4 is a view in elevation of the lower or back end of the handle showing the weighing scale extended for use.

Figure 5 is a view in elevation of the nipple upon which the scale parts are carried.

Figure 6 is a view in side elevation of the spring suspended rod together with the cap and barb which are pivotally attached thereto.

Figure 7 is a view partly in side elevation and partly in section of the device in the form provided for carrying in the pocket.

Referring now more particularly to the drawing the numeral 10 generally designates the butt end of a fishing rod or pole, a portion of the pole, designated 12, being shown attached to the forward end of the handle while the numeral 14 designates the hand grip which may be of any suitable construction but is here illustrated as being formed of cork.

The hand grip has formed therein from the back or bottom end, the tubular passage 16 which is here shown as having a metal liner 18 fixed therein.

The lower end of the liner or tube which actually forms the casing for the scale structure, projects beyond the lower or back end of the hand grip and is fixed at its lower end in the constricted portion 20 of a ferrule 22 which encircles the rear end of the hand grip and is fixed thereto in a conventional manner.

At the lower or rear end the tubular casing or sleeve 18 is internally screw threaded as indicated at 24 to receive one end of a coupling nipple such as is shown in elevation in Figure 5 and generally designated 26. As shown this coupling nipple has about it, intermediate its ends, the polygonal nut 28 and is screw threaded on each side of the nut as indicated at 30 and 32.

As previously stated one end of the nipple 26 is threaded into the lower end of the tubular sleeve or casing 18 as shown in Figure 1 with the nut 28 bearing against the end of the sleeve and the constricted portion 29 of the ferrule. The other or outer end of the nipple has removably threaded thereon the internally threaded closure cap 34 which carries the hereinafter described weighing elements of the scale.

As shown most clearly in Figure 4 the cap 34 has fixed in the bottom thereof or upon the inner face of the end wall as indicated at 36, an end of a flat barb, spur or hook 38 which is tapered to a point 40 at its outer end. This spur or hook is on the axial center of the cap and has formed transversely therethrough adjacent to the fixed bottom end 36, a suitable hole or opening 41 for the passage of a pivot pin 42 which extends diametrically across the inside of the cap and is fixed at its ends in the opposite sides of the cap as shown most clearly in Figures 1 and 3.

The numeral 44 generally designates the suspension rod which has a head 45 upon its inner end while at its outer end it is provided with the longitudinal slot 46. Between the inner end of the slot 46 and the head 45 a portion of the rod 44 is cut away or flattened as indicated at 47 to provide a proper surface upon which may be placed weighing numerals, as shown, starting at zero at the lower end of the scale face and running 1, 2, 3 etc. up to the maximum poundage which the scale is designed to indicate.

The slotted or bifurcated end of the rod 44 receives in the slot the weighing hook 38 and the two portions or furcations have the pin 42 extended transversely therethrough as shown in Figure 1. Thus when the cap 34 is detached from the nipple 26, which actually forms a part of the housing or casing for the rod 44 and the hereinafter referred to spring, the rod can drop down out of the casing as will be readily apparent.

Encircling the rod 44 and resting at one end upon the inner end of the nipple 26, as shown in Figure 1, is the weighing spring 48. The upper end of the spring opposes but is spaced from the head 45, when the parts are enclosed in the tubular housing. When the cap 34 is unscrewed from the outer end of the nipple 26 the rod 44 may drop down until the head 45 rests upon the top of the spring whereupon the zero marking on the scale face 47 will be in the plane of the outer end of the nipple 26. When the rod has dropped to this position as shown in Figure 4, the cap 34 can then be turned or rocked so as to project the hook or barb 38 outwardly from the recess or slot 46 to permit the hanging of a fish on the barb.

As will be readily apparent, when the fish or any other weight is hung on the barb or hook 38 the rod will then be pulled down to compress the spring 48 until the resistance of the spring equals the weight of the fish or other body being weighed and the amount of the weight will be shown in pounds on the scale face 47 by the number or figure appearing below the outer end of the nipple 26 as will be readily seen.

Where it may be desired to carry the scales in the pocket there is provided a separate housing as shown in Figure 7. Such separate housing comprises the tubular casing 50 which is closed at its top end by the head 51 which has an outside diameter greater than the diameter of the casing so that the casing can be held in the hand without slipping even though the hand may be wet from handling a fish.

The opposite end of the casing 50 is open and internally threaded as indicated at 52 so as to receive the threaded end portion 30 of the nipple 26. Since the parts shown in the casing 50 in Figure 7 are the same as those shown in the tubular casing 18 in Figure 1 the same reference characters are employed.

From the foregoing it will be readily seen that there is provided by the present invention a novel and handy weighing scales which can be completely housed in the butt or hand grip of the fishing rod and is readily accessible for use in weighing a fish as the fish is taken from the hook. After the weighing process is completed the scales can be reinserted into the handle of the fishing pole easily and quickly so as to be out of the way for further use of the pole.

I claim:

1. A weighing scale of the character set forth comprising an elongate tubular housing closed at one end and having the other end open with internal screw threads therein, a tubular nipple having external screw threads on each of its two ends, said nipple having one of its ends threaded into the said open end of said housing, a cap threaded on the other end of said nipple, a spring suspended rod in the casing and having one end attached to the cap whereby the rod may be drawn out of the housing against the resistances of the suspending spring when the cap is detached from the nipple, said rod having weight indicating numerals longitudinally thereon, and means for suspending a body from the cap attached end of the rod comprising a pivot coupling between the cap and the rod and a barb attached to the cap and shiftable from a position lengthwise of the rod to an outwardly directed position relative thereto upon the turning of the cap on its pivot to one position.

2. A weighing scale of the character set forth comprising an elongate tubular housing closed at one end and having the other end open with internal screw threads therein, a tubular nipple having external screw threads on each of its two ends, said nipple having one of its ends threaded into the said open end of said housing, a cap threaded on the other end of said nipple, a spring suspended rod in the casing, a pivot coupling between the lower end of the rod and the cap whereby the cap turns on an axis extending transversely of the rod, the rod being adapted to be drawn out of the housing against the resistance of the spring when the cap is unscrewed from the nipple, and means for suspending a body from the rod comprising a barb attached to the inside of the cap to be moved from a position lengthwise of the rod to a position in which it is directed outwardly therefrom on the turning of the cap on said pivot.

3. The invention as set forth in claim 2, wherein said barb is positioned to have its point directed into the housing when the cap is screwed onto the nipple and said rod has a longitudinal slot in the lower end thereof into which the barb is received.

4. The invention as set forth in claim 2, wherein the spring suspending said rod is of the coil type encircling the rod and bearing at one end upon the inner end of said nipple, said rod having a head upon its inner end in spaced opposed relation with the other end of the spring when the cap is in closing position on the outer end of the nipple and adapted to rest upon said other end of the spring when the cap is released and the rod is shifted outwardly.

5. In combination, a fishing rod handle having a hand grip at one end, said grip having a tubular passage extending thereinto from its rear end, a tubular housing fitted in said passage, a tubular nipple having one end threaded into the rear end of the housing and having its other end externally threaded and extending rearwardly from the housing, an elongate weighing rod disposed in the housing and having a head on its inner end, a coil spring in the housing and encircling the rod and positioned between the inner end of the nipple and said head to resist outward movement of the rod, a cap adapted to be threaded upon and to close the outer end of the nipple, a pivot pin passing across the inside of the cap and through the outer end of the rod whereby the cap may rock on an axis extending across the rod, said outer end of the rod having a slot longitudinally therein, and a barb hook rigidly secured at one end to the cap and having said pivot pin passing therethrough and adapted to position in said slot of the rod when the cap is threaded on the nipple.

References Cited in the file of this patent

UNITED STATES PATENTS

| Number | Name | Date |
| --- | --- | --- |
| 2,446,720 | Rominski | Aug. 10, 1948 |
| 2,488,042 | Thun | Nov. 15, 1949 |